(12) United States Patent
Verrall et al.

(10) Patent No.: US 7,642,226 B2
(45) Date of Patent: *Jan. 5, 2010

(54) POLYVINYL ALCOHOL COPOLYMER FILM FOR PACKAGING LIQUID PRODUCTS AND HAVING AN IMPROVED SHELF-LIFE

(75) Inventors: Andrew P. Verrall, Crown Point, IN (US); P. Scott Bening, Crown Point, IN (US); Karen A. Kugler, Porter, IN (US)

(73) Assignee: Monosol, LLC, Merrillville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/366,150

(22) Filed: Mar. 2, 2006

(65) Prior Publication Data

US 2006/0148668 A1    Jul. 6, 2006

Related U.S. Application Data

(63) Continuation of application No. 10/392,030, filed on Mar. 19, 2003, now Pat. No. 7,022,656.

(51) Int. Cl.
*C11D 17/00* (2006.01)
(52) U.S. Cl. .................. 510/293; 510/295; 510/296; 510/438; 428/35.2; 526/264; 526/330
(58) Field of Classification Search .................. None
See application file for complete search history.

(56) References Cited

U.S. PATENT DOCUMENTS 4,416,791 A   11/1983  Haq
4,557,852 A   12/1985  Schulz et al.
4,747,976 A    5/1988  Yang et al.

(Continued)

FOREIGN PATENT DOCUMENTS

EP      0 291 198 A2    11/1988

(Continued)

OTHER PUBLICATIONS

International Search Report corresponding to International Patent Application Serial No. PCT/US04/008231, mailed Aug. 3, 2004.

(Continued)

*Primary Examiner*—Necholus Ogden, Jr.
(74) *Attorney, Agent, or Firm*—Marshall, Gerstein & Borun LLP

(57) ABSTRACT

Generally speaking, the present invention is a water-soluble copolymer film comprising a hydrolyzed copolymer of vinyl acetate and a second monomer, the resultant polyvinyl alcohol copolymer having a degree of hydrolysis, expressed as a percentage of vinyl acetate units converted to vinyl alcohol units, of from about 90% to 100%. The second monomer is preferably selected from the group of monomers having carboxylate functionality or sulfonate functionality. The resulting water-soluble copolymer film is disclosed for use in making pouches to contain a unit dose of liquid detergent, such as a liquid laundry detergent. However, it is an aspect of the copolymer film that film solubility is not significantly affected adversely by the detergent. Such film produces pouches having a greater storage shelf-life over prior art water-soluble film.

3 Claims, 2 Drawing Sheets

U.S. PATENT DOCUMENTS

| | | | |
|---|---|---|---|
| 4,806,261 | A | 2/1989 | Ciallella et al. |
| 4,973,416 | A | 11/1990 | Kennedy |
| RE33,646 | E | 7/1991 | Klemm et al. |
| 5,070,126 | A | 12/1991 | Toyonishi et al. |
| 5,160,654 | A | 11/1992 | Falou et al. |
| 5,234,615 | A | 8/1993 | Gladfelter et al. |
| 5,362,413 | A | 11/1994 | Kaufmann et al. |
| 6,037,319 | A | 3/2000 | Dickler et al. |
| 6,136,776 | A | 10/2000 | Dickler et al. |
| 6,166,117 | A | 12/2000 | Miyazaki |
| 6,608,121 | B2 | 8/2003 | Isozaki et al. |
| 2002/0182348 | A1 | 12/2002 | Fujiwara et al. |

FOREIGN PATENT DOCUMENTS

| | | |
|---|---|---|
| EP | 0 444 230 B1 | 7/1995 |
| EP | 1 158 016 A2 | 11/2001 |
| EP | 1 180 536 A1 | 2/2002 |
| EP | 1 251 147 A1 | 10/2002 |
| JP | 63168437 | 7/1988 |
| JP | H02-163149 | 6/1990 |
| JP | 07-118407 | 5/1995 |
| JP | 7118407 | 5/1995 |
| JP | 2000109574 | 4/2000 |
| JP | 2001220411 | 8/2000 |
| WO | WO 94/04656 | 3/1994 |
| WO | WO 01/79417 A1 | 10/2001 |

OTHER PUBLICATIONS

Advertisements showing a water-soluble film packet for containing dry bleaches, soaps, detergents, dyes, and other soluble products, Mono-Sol Corporation and Baldwin Rubber Company, 1962.

Moritani et al., Funcitonal modification of poly (vinyl alcohol) by copolymerization: II, Modification with a sulfonate monomer, Polymer, vol. 39, No. 3, pp. 553-557 (1998).

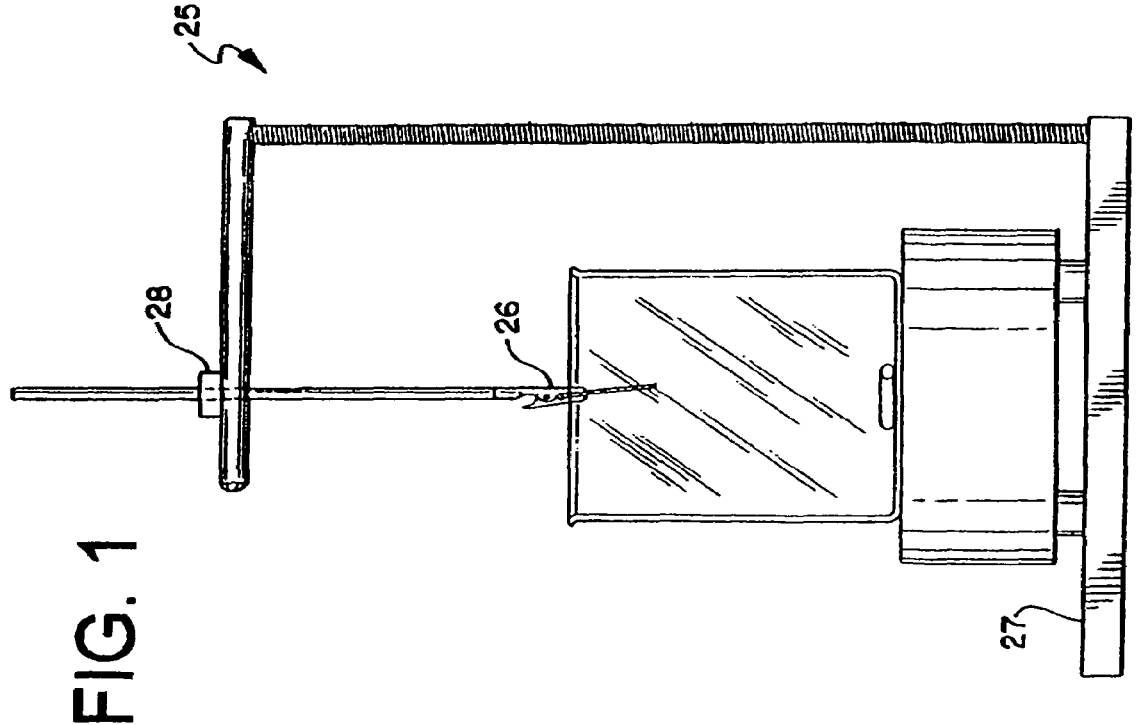
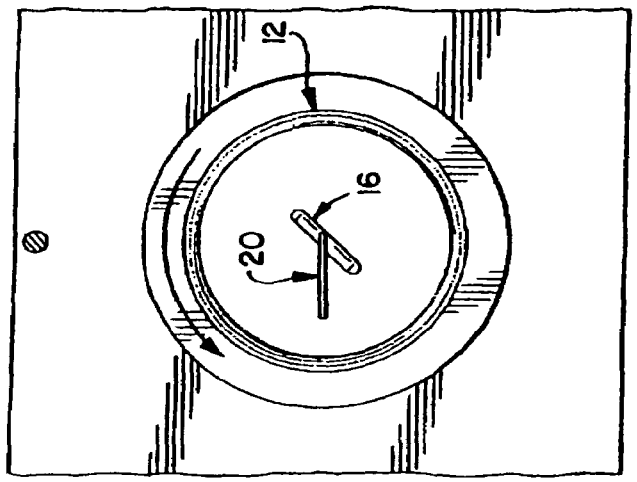

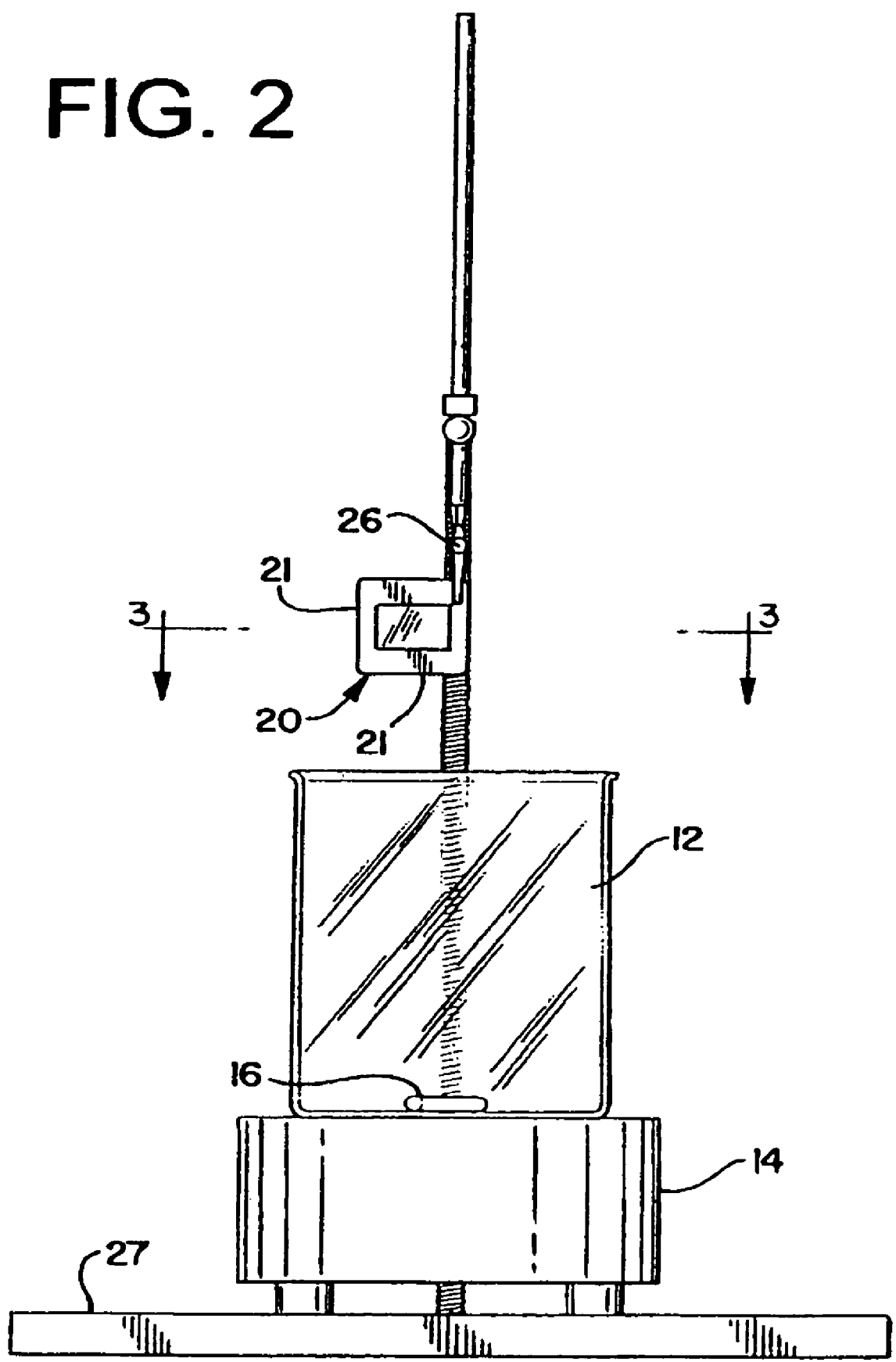

POLYVINYL ALCOHOL COPOLYMER FILM FOR PACKAGING LIQUID PRODUCTS AND HAVING AN IMPROVED SHELF-LIFE

CROSS REFERENCE TO RELATED APPLICATIONS

This is a Continuation of U.S. application Ser. No. 10/392,030 (now U.S. Pat. No. 7,022,656) filed Mar. 19, 2003 the disclosure of which is incorporated herein by reference in its entirety.

TECHNICAL FIELD OF THE INVENTION

The present invention relates generally to polyvinyl alcohol copolymer film for packaging liquid products, such as, for example, laundry detergent. More specifically, the present invention relates to polyvinyl alcohol copolymer film wherein the copolymer has structural features which provide an improved film shelf-life.

BACKGROUND OF THE INVENTION

Polyvinyl alcohol (PVOH) is a synthetic resin generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water—greater than about 140° F. (60° C.). If a sufficient number of acetate groups are allowed to remain after the hydrolysis of polyvinyl acetate, the PVOH polymer then being known as partially hydrolyzed, it is more weakly hydrogen-bonded and less crystalline and is soluble in cold water—less than about 50° F. (10° C.). Both fully and partially hydrolyzed PVOH types are commonly referred to as PVOH homopolymers although the partially hydrolyzed type is technically a vinyl alcohol-vinyl acetate copolymer.

The term PVOH copolymer is generally used to describe polymers that are derived by the hydrolysis of a copolymer of a vinyl ester, typically vinyl acetate, and another monomer. PVOH copolymers can be tailored to desired film characteristics by varying the kind and quantity of copolymerized monomers. Examples of copolymerizations are those of vinyl acetate with a carboxylic acid or with an ester of a carboxylic acid. Again, if the hydrolysis of acetate groups in these copolymers is only partial, then the resulting polymer could be described as a PVOH terpolymer—having vinyl acetate, vinyl alcohol, and carboxylate groups—although it is commonly referred to as a copolymer.

It is known in the art that many PVOH copolymers, because of their structure, can be much more rapidly soluble in cold water than the partially hydrolyzed type of PVOH homopolymers. Such copolymers have therefore found considerable utility in the fabrication of packaging films for the unit dose presentation of various liquid and powdered products including agrochemicals, household and industrial cleaning chemicals, laundry detergents, water treatment chemicals and the like.

Examples of such copolymers are those prepared by the hydrolysis (base catalyzed alcoholysis) of copolymers of vinyl acetate and carboxylic acid vinyl monomers, and copolymers of vinyl acetate and esters of carboxylic acid vinyl monomers. If sufficient base is present such that the acid groups (including those resulting from ester hydrolysis) are neutralized to form carboxylate salt groups i.e., ionomer groups, the cold water-solubility of these PVOH copolymers, and hence films fabricated from them, is very rapid. Examples of carboxylate-containing PVOH copolymers derived from monocarboxylic acid vinyl monomers and their esters are those prepared by the hydrolysis of a vinyl acetate-acrylic acid copolymer, a vinyl acetate-crotonic acid copolymer, a vinyl acetate-methyl acrylate copolymer, a vinyl acetate-methacrylic acid copolymer, and a vinyl acetate-methyl methacrylate copolymer, all of which have excellent cold water-solubility. In fact, packaging films based on PVOH copolymers having carboxylate groups are generally considered in the art to be the most rapidly cold water-soluble films.

One of the largest markets for these films is the liquid laundry detergent market where the convenience of the unit dose concept is widely accepted and the rapid solubility of the films is particularly suited to this application.

However, a significant problem exists with the chemical compatibility of virtually all liquid laundry detergent formulations and most of the commercial film used to package these products. The commercial film is based on a carboxylate-containing PVOH copolymer where the carboxylate units, if converted to carboxylic acid groups, are readily able to form stable lactones by cyclizing with adjacent hydroxyl groups. Specifically, the chemical incompatibility derives from the acid-base equilibria that exist in the liquid laundry detergent formulations and are usually in the form of amine-fatty acid equilibria and/or amine-anionic surfactant acid equilibria. Even if the detergent formulation is at an alkaline pH by virtue of the presence of a molar excess of amine, exchangeable hydrogen ions are still available to react with the carboxylate groups of the PVOH copolymer. When this happens, carboxylic acid groups form and they in turn will readily react with adjacent hydroxyl groups to form intramolecular lactones if the lactones have stable five-membered (gamma, γ) ring structures. Other liquid products too numerous to mention may present similar chemical incompatibilities and are, therefore, addressed by the present invention.

The solubility of the polymer and hence the film is markedly affected by this reaction to form lactones; complete insolubility can occur in some cases resulting in polymer residues being attached to items of clothing at the end of a wash cycle. All the above-mentioned carboxylate-containing copolymers derived from monocarboxylic acid vinyl monomers and their esters are subject to this reversion to stable γ-lactones in the presence of hydrogen ions. There is therefore a need to provide cold water-soluble films, preferably including those based on PVOH copolymers having carboxylate functionality (because of their fast solubility) where the functional groups of the copolymers which facilitate cold water solubility are substantially unaffected by hydrogen ions or, if chemically modified by reaction with hydrogen ions, the modified functional groups do not significantly affect the water solubility of the films.

SUMMARY OF THE INVENTION

A water-soluble copolymer film is disclosed for use in making pouches to contain a liquid material, such as a liquid laundry detergent, wherein the film solubility is not significantly affected adversely by the detergent. Such film produces pouches having a greater storage shelf-life over prior art water-soluble film.

In one embodiment, the present water-soluble film comprises vinyl acetate copolymerized with itaconic acid as a second monomer to produce, after hydrolysis, a polyvinyl alcohol copolymer with a degree of hydrolysis, expressed as a percentage of vinyl acetate units converted to vinyl alcohol units, from about 98% to about 100%.

In several other embodiments, the second monomer may be selected from the group of monomers consisting of monocarboxylic acid vinyl monomers, their esters and anhydrides, dicarboxylic monomers having a polymerizable double bond, their esters and anhydrides, and vinyl sulfonic acid monomers and their alkali metal salts. The degree of hydrolysis for these copolymer embodiments varies.

In such embodiments where the second monomer is one of either monocarboxylic acid vinyl monomers, their esters and anhydrides, dicarboxylic monomers having a polymerizable double bond, or their esters and anhydrides, it is an aspect of the invention that the monomer be specifically selected from the group consisting of vinyl acetic acid, maleic acid, monomethyl maleate, dimethyl maleate, maleic anhydride, itaconic acid, monomethyl itaconate, dimethyl itaconate, and itaconic anhydride. Most preferably, the second monomer is itaconic acid.

In other such embodiments it is an aspect of the invention that the second monomer is a vinyl sulfonic acid monomer or its alkali metal salts. Specifically, the second monomer is selected from the group of sulfonic acid monomers and their alkali metal salts consisting of vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, and 2-sulfoethyl acrylate. Most preferably, the second monomer for these embodiments is 2-acrylamido-2-methylpropanesulfonic acid.

Generally speaking, the present invention is a water-soluble copolymer film comprising vinyl acetate copolymerized with a second monomer to produce a polyvinyl alcohol copolymer having certain structural features which serve to improve the shelf life of the film, and wherein the second monomer is selected from the group consisting of monomers having carboxylate functionality or sulfonate functionality.

It is another aspect of the disclosed invention to produce a liquid product packet comprising a water-soluble film comprised of a polyvinyl alcohol copolymer wherein a comonomer of the film copolymer is selected from the group consisting of monocarboxylic acid vinyl monomers, their esters and anhydrides, dicarboxylic monomers having a polymerizable double bond, their esters and anhydrides or vinyl sulfonic acid monomers and their alkali metal salts. The present embodiment includes a quantity of a liquid product enclosed within the water-soluble film packet.

These and other objects of the invention are disclosed and claimed in the following detailed description of the invention, including the appended drawings.

BRIEF DESCRIPTION OF THE DRAWINGS

The present invention described herein can be more readily understood with reference to the appended drawing figures where:

FIG. 1 is a perspective view of a test apparatus used to determine the water disintegration and dissolution times of film samples;

FIG. 2 is a perspective view of the test apparatus and test set-up illustrating the procedure for determining the water-solubility of film samples; and FIG. 3 is a top view of the test set-up of FIG. 2.

DETAILED DESCRIPTION OF THE INVENTION

While the invention is susceptible of embodiment in many different forms, this disclosure will describe in detail preferred embodiments of the invention with the understanding that the present disclosure is to be considered as an exemplification of the principles of the invention and is not intended to limit the broad aspect of the invention to the embodiments illustrated.

In the present invention, specific monomers within three general chemical classes are selected for copolymerization with vinyl acetate such that the base-catalyzed alcoholysis products of these copolymers, which are used in the formulation of the water-soluble film, retain excellent solubility performance in the presence of hydrogen ions. The copolymers used in the formulation of the water-soluble films have one of either 1) carboxylate functionality or 2) sulfonate functionality.

1. Copolymers with Carboxylate Functionality

Specific monocarboxylic acid vinyl monomers (for example, structure (a) shown below) and their esters and anhydrides, and specific dicarboxylic monomers (for example, structure (b) shown below) having a polymerizable double bond and their esters and anhydrides are selected for copolymerization with vinyl acetate.

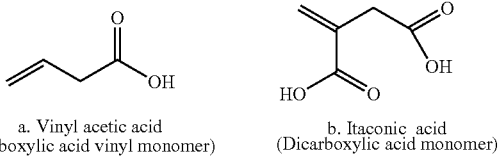

a. Vinyl acetic acid
(Carboxylic acid vinyl monomer)

b. Itaconic acid
(Dicarboxylic acid monomer)

The base-catalyzed alcoholysis products of these copolymers, which are used in the formulation of the water-soluble film, retain carboxylate functionality in the presence of hydrogen ions because of the low steric stability, and therefore non-formation, of six-membered (delta, δ) lactone rings. Examples of the selected monomers are vinyl acetic acid, maleic acid, monomethyl maleate, dimethyl maleate, maleic anhydride, itaconic acid, monomethyl itaconate, dimethyl itaconate and itaconic anhydride.

By way of illustration and comparison, structures (c) and (d) are provided to show the sterically favored γ-lactone and the non-favored δ-lactone, respectively, as they would form on the polyvinyl alcohol polymer backbone:

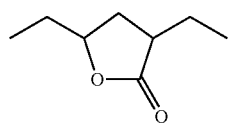

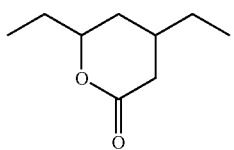

A carboxylate-containing PVOH copolymer based on the copolymerization of, for example, acrylic acid with vinyl acetate would have its carboxylate unit directly attached to the polymer backbone and therefore, when in the acid form, able to form a stable five-membered γ-lactone (structure (c) above) by cyclizing with an adjacent hydroxyl group. In contrast, a copolymer derived from vinyl acetic acid would have a methylene group between the polymer backbone and the carboxylate unit; in this case, only a six-membered δ-lactone (structure (d) above) could form and this is not a sterically favorable entity. In the case of others such as itaconic acid, a dicarboxylic acid, one of the carboxylate groups can ultimately form a γ-lactone but the other can only form a δ-lactone; the latter therefore remains intact and film solubility is preserved.

In the present invention, the preferred monomer for copolymerization with vinyl acetate from the group of monomers providing carboxylate functionality is itaconic acid. The preferred water-soluble film is therefore based on a vinyl alcohol-co-itaconic acid (sodium salt) copolymer.

Copolymer Synthesis

The vinyl acetate-co-itaconic acid copolymer is prepared under nitrogen, and in methanol as solvent, using 2,2'-azobis (isobutyronitrile) (AIDBN) as initiator. Alcoholysis of this copolymer is carried out in methanolic sodium hydroxide and the recovered vinyl alcohol-co-itaconic acid (sodium salt) copolymer is ground, washed to remove residual sodium acetate, and dried. These reactions are known in the art and have been reported, for example, by Moritani et. al (Polymer Preprints, Japan, 31, 126 (1982)).

The preferred degree of polymerization of the vinyl alcohol-co-itaconic acid (sodium salt) copolymer is such that the viscosity of a 4% aqueous solution at 20° C. is within a range of from about 5. to about 45 MPa·s (cps), including all ranges and combination of ranges which are a subset thereof. More preferred is a range of 11-30 MPa·s and especially preferred is a range of 15-25 MPa·s.

The preferred level of incorporation of itaconic acid comonomer in the vinyl alcohol-co-itaconic acid (sodium salt) copolymer, expressed as a mole percentage, is within the range of from about 1.5 to about 11 mole %, including all ranges and combination of ranges which are a subset thereof. More preferred is a range of 2.5-8.5 mole % and especially preferred is a range of 4-6 mole %.

The preferred degree of hydrolysis of the vinyl alcohol-co-itaconic acid (sodium salt) copolymer of the present invention, expressed as a percentage of vinyl acetate units converted to vinyl alcohol units, is within the range of from about 98 to 100%.

2. Copolymers with Sulfonate Functionality

Specific vinyl sulfonic acid monomers and their alkali metal salts (for example, structure (e) below) are selected for copolymerization with vinyl acetate; the base-catalyzed alcoholysis products of these copolymers, which are used in the formulation of the water-soluble film, are vinyl alcohol-sulfonate salt copolymers which are rapidly soluble.

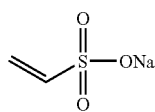

e. Vinyl sulfonic acid sodium salt

The sulfonate group may revert to sulfonic acid in the presence of hydrogen ions but the sulfonic acid group still provides for excellent cold water solubility of the film. Examples of the selected sulfonic acid monomers (and/or their alkali metal salts) include vinyl sulfonic acid, allyl sulfonic acid, ethylene sulfonic acid, 2-acrylamido-1-methylpropanesulfonic acid, 2-acrylamido-2-methylpropanesulfonic acid, 2-methacrylamido-2-methylpropanesulfonic acid and 2-sulfoethyl acrylate.

The preferred monomer for copolymerization with vinyl acetate from the group of monomers providing sulphonate functionality is the sodium salt of 2-acrylamido-2-methylpropanesulfonic acid (AMPS) and the preferred copolymer for incorporation into the water-soluble film is therefore a vinyl alcohol-co-AMPS (sodium salt) copolymer.

Copolymer Synthesis

The vinyl acetate-co-AMPS copolymer is prepared under nitrogen in methanol as solvent, using 2,2'-azobis(isobutyronitrile) (AIBN) as initiator. Alcoholysis of this copolymer is carried out in methanolic sodium hydroxide and the recovered vinyl alcohol-co-AMPS (sodium salt) copolymer is ground, washed to remove residual sodium acetate, and dried. These reactions are known in the art and have been reported, for example, by Moritani and Yamauchi (Polymer, 39 (3), 553-557 (1998)).

The preferred degree of polymerization of the vinyl alcohol-co-AMPS (sodium salt) copolymer is such that the viscosity of a 4% aqueous solution at 20° C. is in the range of from about 3 to about 18 MPa·s (cps), including all ranges and combination of ranges which are a subset thereof. More preferred is a range of from about 4 to about 12 MPa·s.

The preferred level of incorporation of AMPS comonomer in the vinyl alcohol-co-AMPS (sodium salt) copolymer, expressed as a mole percentage, is in the range of from about 1 to about 8 mole %, including all ranges and combination of ranges which are a subset thereof. More preferred is a range of from about 2.5 to about 5 mole %.

The preferred degree of hydrolysis of the vinyl alcohol-co-AMPS (sodium salt) copolymer, expressed as a percentage of vinyl acetate units converted to vinyl alcohol units, is in the range of from about 90 to about 99%. More preferred is a range of from about 94 to about 98%.

Water-Soluble Film Formulation-Additives

The preferred amount of the copolymer with carboxylate or sulfonate functionality in the water-soluble film of the present invention is in the range of from about 40% to about 90% by weight, including all ranges and combination of ranges therein. More preferably the amount of these copolymers is in the range of from about 60% to about 80% by weight.

The water-soluble film of the present invention, in addition to the copolymer with carboxylate or sulfonate functionality, may contain plasticizers, lubricants, release agents, fillers, extenders, antiblocking agents, detackifying agents, antifoams and other functional ingredients. Suitable plasticizers include, but are not limited to, glycerin, diglycerin, sorbitol, ethylene glycol, diethylene glycol, triethylene glycol, tetraethylene glycol, propylene glycol, polyethylene glycols up to 400 MW, neopentyl glycol, trimethylolpropane, polyether polyols and ethanolamines.

Preferred plasticizers are glycerin, triethyleneglycol, propylene-glycol and trimethylolpropane. The preferred amount of plasticizer incorporated in the water-soluble film of the present invention is in the range of from about 5% to about 30% by weight, more preferably in the range of from about 12% to about 20% by weight.

Suitable surfactants may include the nonionic, cationic, anionic and zwitterionic classes. Preferably, the surfactants will be of the nonionic, cationic or zwitterionic classes or combinations of these. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Preferred surfactants are alcohol ethoxylates, quaternary ammonium salts and amine oxides. The preferred amount of surfactant in the water-soluble film of the present invention is in the range of from about 0.01% to about 1% by weight, more preferably from about 0.1% to about 0.6% by weight.

Suitable lubricants/release agents include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. The preferred amount of lubricant/release agent in the water-soluble film of the present invention is within the range of from about 0.02% to about 1.5% by weight, more preferably from about 0.04% to about 0.15% by weight.

Suitable fillers/extenders/antiblocking agents/detackifying agents include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. The preferred amount of filler/extender/antiblocking agent/detackifying agent in the water-soluble film of the present invention is in the range of from about 0.1% to about 25% by weight, more preferably from about 1% to about 15% by weight. In the absence of starch, the preferred range for a suitable filler/extender/aniblocking agent/detackifying agent is from about 1% to about 5% by weight.

Suitable antifoams include, but are not limited to, those based on polydimethylsiloxanes and hydrocarbon blends. The preferred amount of antifoam in the water-soluble film of the present invention is in the range of from about 0.001% to about 0.5%, and more preferably from about 0.01% to about 0.1% by weight.

After formulation, the desired film thickness is within the range of from about 5 to about 200 μm, preferably within the range of from about 20 to about 100 μm, and most preferably from about 40 to about 85 μm.

Comparison Test of Film: Set-Up and Procedure

The data below represents comparative chemical compatibility testing of two PVOH copolymer films. The first film is a vinyl alcohol-co-itaconic acid (sodium salt) copolymer-based film representing the invention of the present application (Film 1), while the second film is based on a hydrolyzed vinyl acetate—methyl acrylate copolymer (Film 2).

The two films were cast with similar additives as detailed above to create workable film samples having the characteristics detailed in Table 1. Film thicknesses measured approximately 76 microns. Pouches having dimensions of approximately 7.5 cm×7.5 cm (about 3 in.×3 in.) and open on one side were prepared using conventional heat-sealing equipment.

TABLE 1

| Film Characteristics | | |
|---|---|---|
| Copolymer properties: | Film 1 | Film 2 |
| Viscosity (cps) | 20 | 20 |
| Mole % comonomer | 5.4 | 5.1 |
| Degree of Hydrolysis(%) | 99.8 | 99.8 |

To each pouch was added a fill of 50 ml of Ariel Essential (Procter & Gamble, Fabric & Home Care Products—Europe), a liquid laundry detergent and the final heat seal made. While the following test specifically references the packaging of a liquid laundry detergent, it should be understood that the present invention applies equally to the packaging of other liquid products having similar chemical incompatibilities with the prior art films. Compatibility testing was performed over a period of five weeks with weekly testing of film solubility in accordance with MonoSol Standard Test Method MSTM 205. Between testing periods pouches were contained in HDPE screw-top jars at storage conditions of 38° C./80% RH. The test method is used to determine the time required for a water-soluble film to break apart (disintegrate) and its subsequent dissolution time under controlled conditions of water temperature and agitation. Before film solubility testing, the pouch was opened, the liquid detergent was discarded, and the film was cleaned by wiping with an absorbent paper towel.

The test procedure is disclosed with reference to appended FIGS. 1-3.

MONOSOL TEST METHOD 205 (MSTM 205).

Apparatus and Materials:
  600 mL Beaker 12
  Magnetic Stirrer 14 (Labline Model No. 1250 or equivalent)
  Magnetic Stirring Rod 16 (5 cm)
  Thermometer (0 to 100° C.,±1° C.)
  Template, Stainless Steel (3.8 cm×3.2 cm)
  Timer, (0-300 seconds, accurate to the nearest second)
  Polaroid 35 mm Slide Mount 20 (or equivalent)
  MonoSol 35 mm Slide Mount Holder 25 (or equivalent, see FIG. 1)
  Distilled Water Test Specimen:
1. Cut three test specimens from film sample using stainless steel template (i.e., 3.8 cm×3.2 cm specimen). If cut from a film web, specimens should be cut from areas of web evenly spaced along the transverse direction of the web.
2. Lock each specimen in a separate 35 mm slide mount 20.
3. Fill beaker 12 with 500 mL of distilled water. Measure water temperature with thermometer and, if necessary, heat or cool water to maintain temperature at 20° C. (about 68° F.).
4. Mark height of column of water. Place magnetic stirrer 14 on base 27 of holder 25. Place beaker 12 on magnetic stirrer 14, add magnetic stirring rod 16 to beaker 12, turn on stirrer 14, and adjust stir speed until a vortex develops which is approximately one-fifth the height of the water column. Mark depth of vortex.
5. Secure the 35 mm slide mount 20 in the alligator clamp 26 of the MonoSol 35 mm slide mount holder 25 (FIG. 1) such that the long end 21 of the slide mount 20 is parallel to the water surface, as illustrated in FIG. 2. The depth adjuster 28 of the holder 25 should be set so that when dropped, the end of the clamp 26 will be 0.6 cm below the surface of the water. One of the short sides 23 of the slide mount 20 should be next to the side of the beaker 12 with the other positioned directly over the center of the stirring rod 16 such that the film surface is perpendicular to the flow of the water, as illustrated in FIG. 3.
6. In one motion, drop the secured slide and clamp into the water and start the timer. Disintegration occurs when the film breaks apart. When all visible film is released from the slide mount, raise the slide out of the water while continuing to monitor the solution for undissolved film fragments. Dissolution occurs when all film fragments are no longer visible and the solution becomes clear.

Data Recording:
  The results should include the following:
  complete sample identification;
  individual and average disintegration and dissolution times; and
  water temperature at which the samples were tested.
  Exposed film disintegration time (in seconds) and the time for complete dissolution (in seconds) were obtained (e.g., 27 s/50 s), with the results of the five week testing being reported in Table 2 below.

TABLE 2

| | Comparison Test Results | | | | | |
|---|---|---|---|---|---|---|
| | Initial Solubility | 1 Week | 2 Weeks | 3 Weeks | 4 Weeks | 5 Weeks |
| Film 1 | 27 s/50 s | 23 s/53 s | 31 s/86 s | 44 s/129 s | 43 s/94 s | 35 s/75 s |
| Film 2 | 33 s/58 s | 56 s/117 s | 67 s/152 s | 75 s/192 s | 86 s/235 s | 95 s/251 s |

Solubility time increases for Film 1 are 30% for disintegration—from 27 seconds to 35 seconds—and 50% for complete dissolution—from 50 seconds to 75 seconds—reflecting the conversion of one of the carboxylate groups deriving from the itaconate moeity to a γ-lactone while the other carboxylate group remains unaffected by hydrogen ions in the detergent formulation. In contrast, the solubility time increases for Film 2 are 188% for disintegration—from 33 seconds to 95 seconds—and 333% for complete dissolution—from 58 seconds to 251 seconds—reflecting a substantial conversion of the carboxylate groups present in the copolymer of Film 2, all of which are capable of forming γ-lactones. Although complete dissolution of Film 2 eventually occurs at 10° C., this substantial conversion of carboxylate units to lactone units is known to have the potential to result in significant polymer residues after laundry wash cycles at higher temperatures.

While specific embodiments have been illustrated and described, numerous modifications are possible without departing from the spirit of the invention, and the scope of protection is only limited by the scope of the accompanying claims.

We claim:

1. A water-soluble packet, comprising:
    (a) a copolymer film comprising a hydrolyzed copolymer which is poly(vinyl alcohol co-maleate); and
    (b) a quantity of liquid laundry detergent contained within the packet in direct contact with said copolymer film, said liquid laundry detergent being characterized by acid/base equilibria;
    wherein:
        (i) the hydrolyzed copolymer has a degree of hydrolysis, expressed as a percentage of vinyl acetate units converted to vinyl alcohol units, of about 90% to about 100%;
        (ii) the level of incorporation of the maleate is in a range of about 1.5 mole % to about 11 mole %;
        (iii) the copolymer film, after contacting the liquid laundry detergent for 5 weeks, has an increase in disintegration time, measured at 10° C., expressed as a percentage relative to the initial disintegration time, of not more than 50%;
        (iv) said base of the liquid laundry detergent comprises an amine; and
        (v) said acid of the liquid laundry detergent comprises an acid selected from the group consisting of a fatty acid, an anionic surfactant acid, and combinations thereof.

2. The water-soluble packet of claim 1, wherein the level of incorporation of the maleate is in a range of about 2.5 mole % to about 8.5 mole %.

3. The water-soluble packet of claim 1, wherein the increase in disintegration time is not more than 30%.

* * * * *